(No Model.) 5 Sheets—Sheet 1.

J. E. BIDWELL.
MACHINE FOR MILLING AND TAPPING RADIATOR LOOPS.

No. 511,872. Patented Jan. 2, 1894.

Witnesses:
Walter S. Wood
Lerra Westbrook

Inventor.
Joel E. Bidwell
By Fred L. Chappell
Att'y (No Model.)  5 Sheets—Sheet 2.

J. E. BIDWELL.
MACHINE FOR MILLING AND TAPPING RADIATOR LOOPS.

No. 511,872.  Patented Jan. 2, 1894.

Witnesses:

Inventor.

(No Model.) 5 Sheets—Sheet 3.
J. E. BIDWELL.
MACHINE FOR MILLING AND TAPPING RADIATOR LOOPS.
No. 511,872. Patented Jan. 2, 1894.
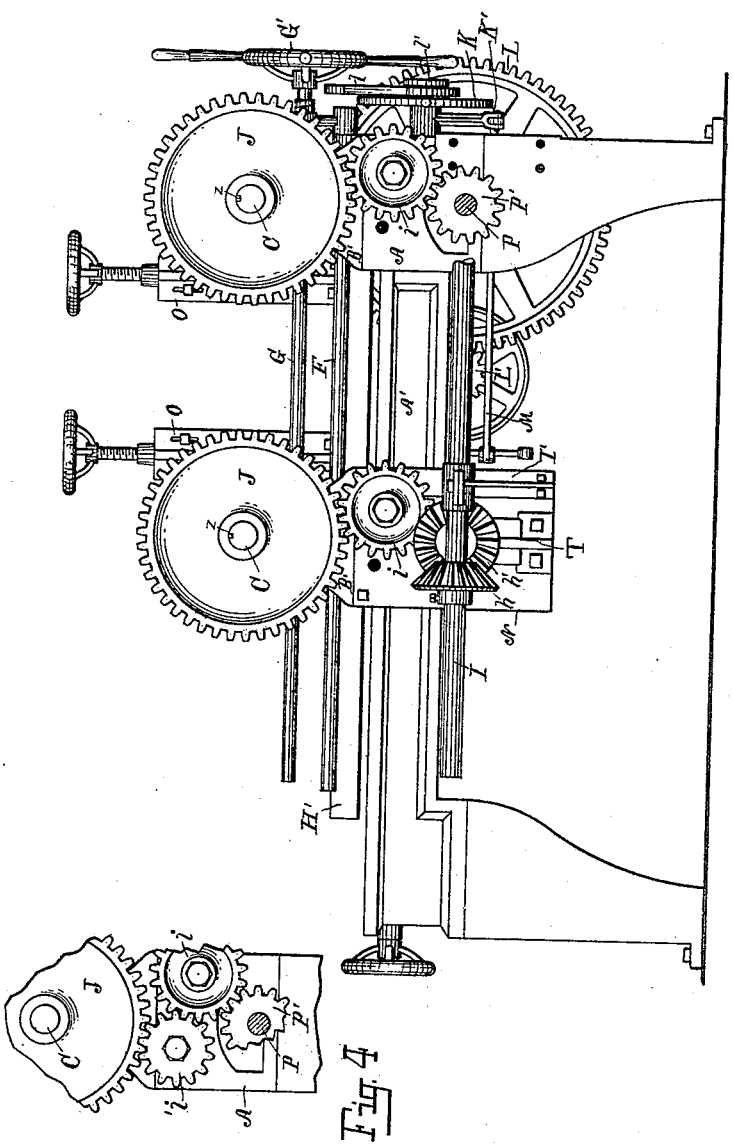
Witnesses:
Walter S. Wood
Corra Westbrook
Inventor.
Joel E. Bidwell
By Fred L. Chappell
Atty.

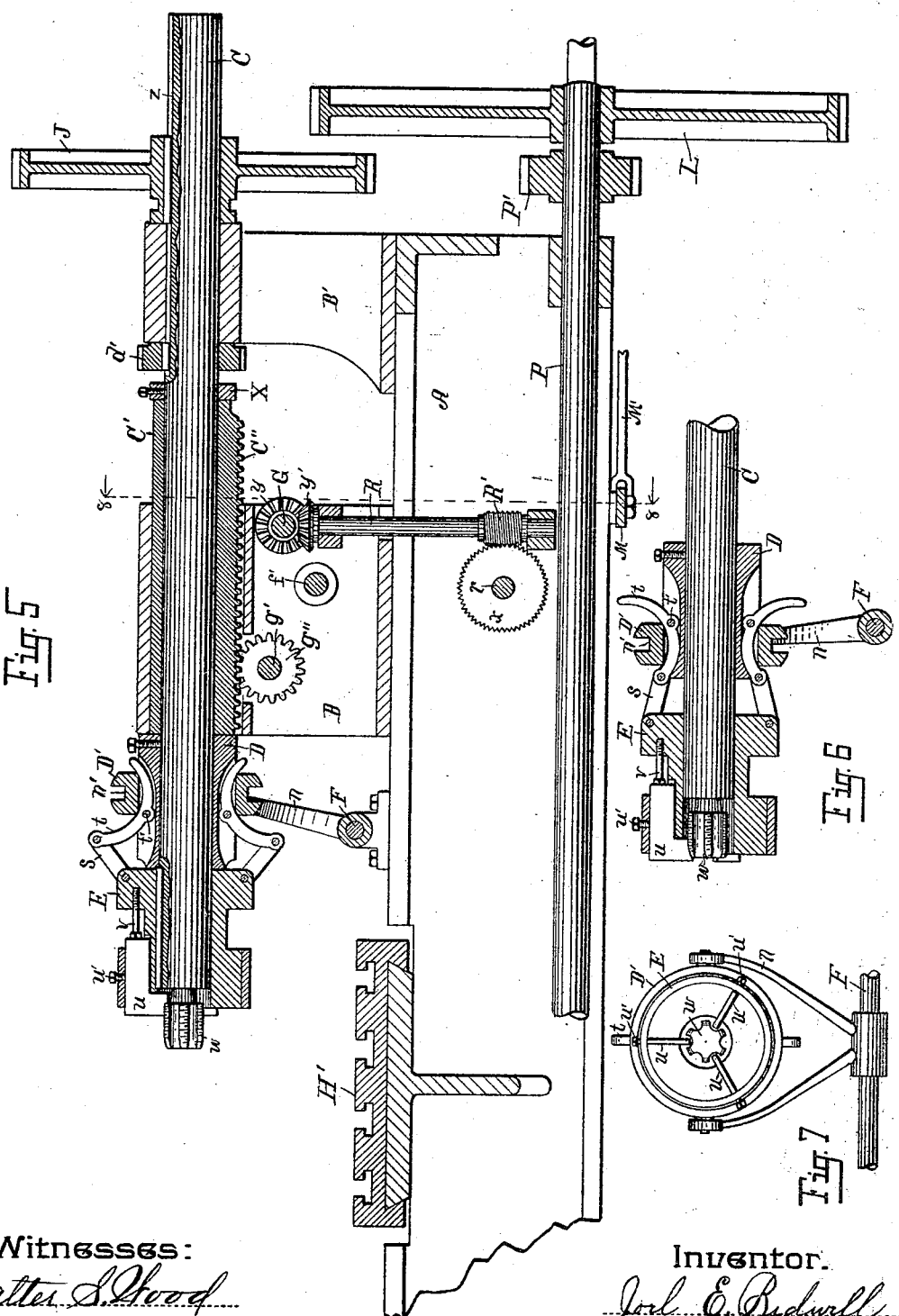

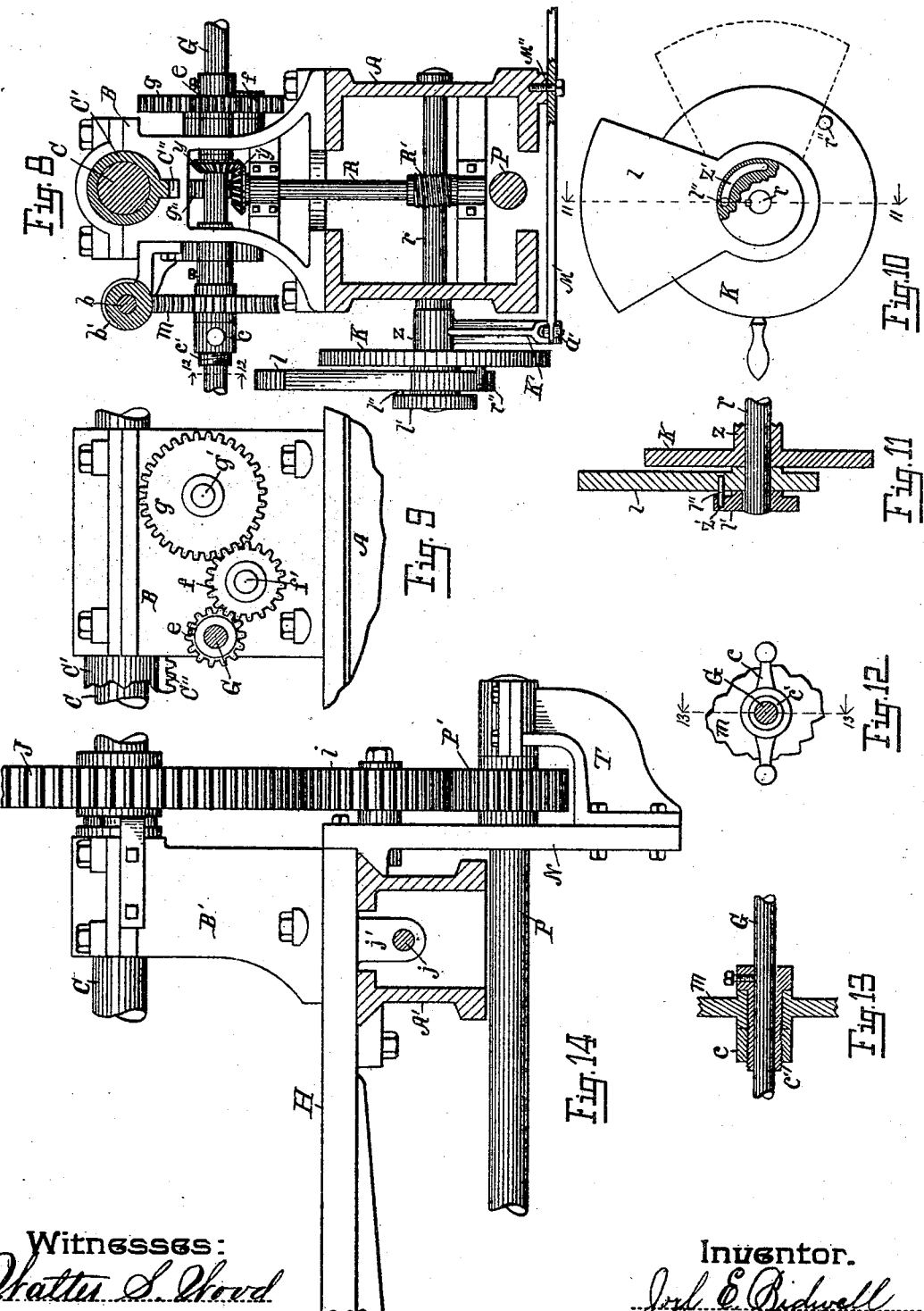

UNITED STATES PATENT OFFICE.

JOEL E. BIDWELL, OF KALAMAZOO, MICHIGAN.

MACHINE FOR MILLING AND TAPPING RADIATOR-LOOPS.

SPECIFICATION forming part of Letters Patent No. 511,872, dated January 2, 1894.

Application filed March 11, 1893. Serial No. 465,639. (No model.)

*To all whom it may concern:*

Be it known that I, JOEL E. BIDWELL, a citizen of the United States, residing at the city of Kalamazoo, in the county of Kalamazoo and State of Michigan, have invented a certain new and useful Machine for Milling and Tapping Radiator-Loops, of which the following is a specification.

My invention relates to machines for manufacturing radiators, and more particularly to a machine for milling the bosses on radiator loops and tapping them so that the loops can be united by screw nipples in the usual way.

The objects of my invention are first, to provide a machine that will mill the bosses on both sides and at both ends of a radiator loop at once; second, to tap the radiator loop on both sides at each end at once; third, to provide a machine that shall be adjustable so that it can mill and tap radiator loops of different lengths; fourth, to provide a machine that shall both mill and tap each boss from the same center or mandrel without changing the tool, stopping the machine, or unclamping the loop; fifth, to provide a machine that shall mill and tap the opposite bosses on a radiator loop by a tap and milling tool that exactly face each other without unclamping the loop, thus insuring uniformity in the loops, which insures a steam tight joint between them when assembled in a radiator; sixth, to provide a machine that may be fed to the work by the hand of the workman or by automatic means as preferred; seventh, a machine that will automatically reverse itself when its work is completed. I accomplish these objects by the mechanism shown in the accompanying drawings, in which—

Figure 1:
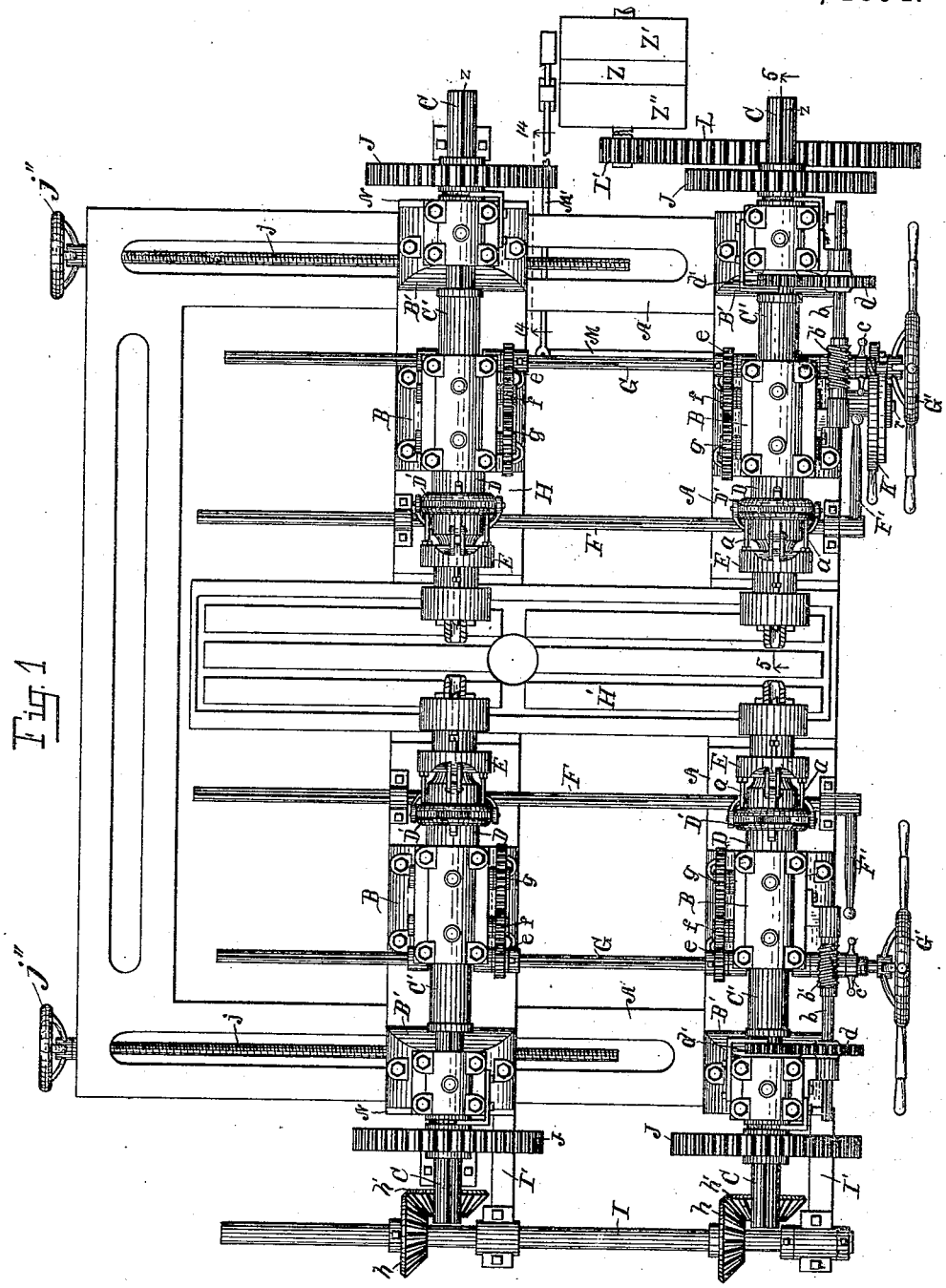
Figure 2:
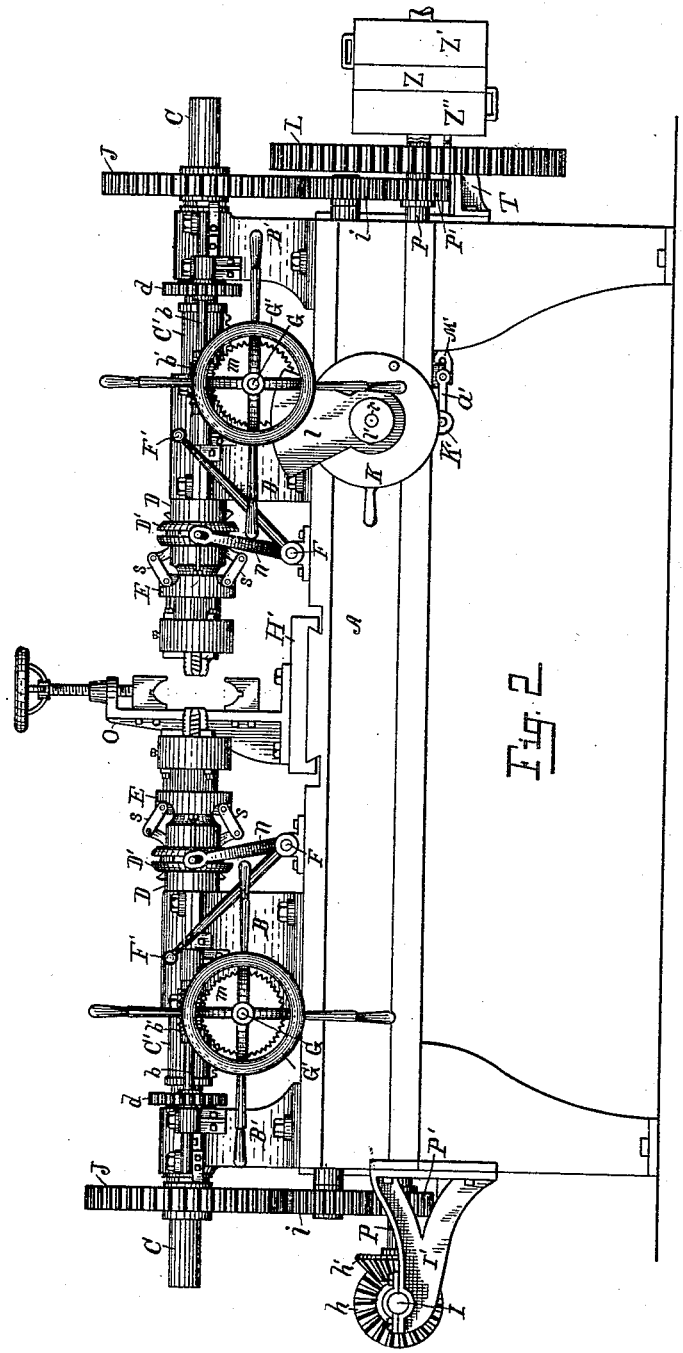

Figure 1, is a plan view of my machine. Fig. 2, is a front elevation of the same. Fig. 3 is an end elevation of the same opposite from where the power is applied. Fig. 4, is a detail showing the gearing changed for reversing the action of one end of the machine. Fig. 5 is an enlarged view partly in section on line 5—5 of Fig. 1, looking in direction of the arrows. Fig. 6 is a view of the head on the mandrel and its tools showing the tools in position for milling the boss. Fig. 7 is a front view of Fig. 6. Fig. 8 is a view partly in section, on line 8—8 of Fig. 5. Fig. 9 is a side view of the upper portion of the part shown in Fig. 8, looking from the right. Fig. 10, is a view of the automatic reversing mechanism. Fig. 11, is a view in section on line 11—11 of Fig. 10. Fig. 12, is a view partly in section on line 12—12 of Fig. 8, showing the hand nut $c$ that clamps the automatic feed mechanism to the shaft G. Fig. 13, is a view in section on line 13—13 of Fig. 12, and Fig. 14, is an enlarged sectional view on line 14—14 of Fig. 1, looking in the direction of the arrows.

Similar letters of reference refer to similar parts throughout the several views.

The taps and the milling tools of my machine are fixed on the ends of two pairs of mandrels C. The axes of each pair of mandrels are in the same line and the mandrels are adapted to reciprocate to and from each other. The pairs of mandrels are in lines parallel to each other and are directly opposite the one to the other.

A, is the main frame on which the entire machine is mounted. The brackets B and B' which bear the front pair of mandrels are bolted firmly to the front of the main frame A. The brackets B and B' which bear the rear mandrels are bolted firmly to a separate bed piece H, which rests on the main frame A, and is adapted to slide over the same. The bed piece H, is moved back and forth by the screws $j$ passing through lugs $j'$ (see Fig. 14) on the under side of the bed piece H, the screws $j$ being operated by the hand wheel $j''$ or other suitable means.

Shafts G, F, and I, containing elongated key seats, pass from the gears on the front part of the machine through corresponding gears of the part rear of the machine. The gears of the rear part of the machine through which the shafts G, F, and I, pass, have feathers which project into the elongated key seats and prevent the shafts turning in the gears but make it possible to vary the distance between the front and rear portions of the machine without changing the shafts. These shafts G, F, and I, make it possible to control both parts of the machine from the same mechanism in front.

The main shafts P, of my machine are directly under the mandrels and parallel with them. The shaft P, to the front part of the machine passes through the main frame A. The shaft P, for the rear part of my machine passes through hangers N, and their brackets T, directly under and parallel with the mandrels C. Supported by brackets I' is the shaft I with mitered gears $h$ which mesh into mitered gears $h'$ on the shafts P and thus unites the shafts P so that power need be applied to but one shaft. One of the gears $h$ is adjustable lengthwise on the shaft I to accommodate any changes in the position of the rear part of the machine.

Power is applied by a belt to the pulley Z and is shifted by the belt shifter M' controlling the belts on the loose pulleys Z' and Z" which it moves onto the tight pulley Z as required. This belt shifter M' is controlled by the lever M which is pivoted to the under side of the main frame A, at M". The mechanism for controlling the lever M will be described farther on. The pulleys Z, Z' and Z" are of course mounted on suitable bearings which it is unnecessary to show in the drawings. Any clutch or other reversing mechanism might be used instead of the tight and loose pulleys shown. The pinion L' is keyed to the same shafts with the pulley Z and meshes into the large gear wheel L which is keyed to the main shaft P and causes it to revolve when power is applied. The platen or table H' is to support the clamps or vises $o$ which hold the radiator loops in position while my machine is in operation.

As the four mandrels C', of my machine operate in the same manner by substantially the same mechanism I will describe only one of them and its operating mechanism.

Referring to Fig. 5, which is a view on line 5—5 of Fig. 1, we have a general view of one of the mandrels and part of its operating mechanism. The pinion P' on the main shaft is geared by an intermediate gear $i$ (see Fig. 3) to the gear J which rotates the mandrel C. The mandrel C has an elongated key seat which receives a feather on the inside of the gear wheel J and also a feather on the inside of the small gear wheel $d'$. This arrangement allows the mandrel C to reciprocate through the gears J and $d'$ and yet rotate with them. The gears J and $d'$ are prevented from moving laterally by any suitable means. The mandrel C passes through a sleeve C' in which it rotates. The collar D, which bears the milling tool, and the ring X which is securely clamped to the mandrel C, prevent the sleeve from moving lengthwise on the mandrel C. The sleeve C' is adapted to reciprocate through the bracket B. It is carried back and forth by the pinion $g''$ acting on the rack C" of sleeve C'. The pinion $g''$ is keyed to the shaft $g'$. This feeds the tap or milling tool as the case may be to the work. On the other end of the shaft $g'$ opposite the gear $g''$ is the gear $g$, which meshes into the gear $f$ which revolves on its bearing $f'$ and meshes with the pinion $e$ which is firmly fixed on the shaft G. To this shaft G is also attached the wheel G' which has convenient arms by which the operator can turn it with his hands when it is desired to feed the machine by hand. On the shaft G is also fixed the small miter gear $y$ which meshes with the gear $y'$. The gear $y'$ is fastened to a perpendicular shaft R which is directly under the mandrel C, shown in Fig. 5. On the shaft R is a worm R' which actuates a worm gear $x$ on the shaft $r$. On the shaft $r$ (see Figs. 8, 10 and 11) is a wheel K having the hub $z$ which bears the arm K' which is connected by the link $a'$ to the lever M which moves the belt, shifts or operates a clutch, or other shifting mechanism, as the case may be. A weight $l$ having the pin $l''$ projecting from it is also journaled on the shaft $r$ to oscillate back and forth. On the end of the shaft $r$ is fixed a small wheel $l'$ having a groove $z'$ cut part way around it. When the shaft $r$ is sufficiently rotated by the worm R' to carry the end of the slot $z'$ against the pin $l''$ and carry the center of gravity of the weight $l$ past its center of support the weight will fall against the pin $r''$ which will by means of the arm K' swing the lever M and so reverse the machine. Of course only one of the weight reversing mechanisms will need to be used on the entire machine.

The automatic feed is operated from the gear $d'$ which meshes with the gear $d$ which is on the shaft $b$ which lies parallel with the mandrel C. A feather on the inside of the gear $d$ fits into an elongated key seat on the shaft $b$ which allows the shaft to reciprocate but causes the two to revolve together. On the shaft $b$ is the worm $b'$ which actuates the worm gear $m$ which is on the same shaft G which carries the hand wheel G'. This worm gear $m$ is adapted to revolve on the shaft G when the machine is fed by hand. It is clamped solid to the collar $c'$ which is keyed to the shaft G by the hand nut $e$ when the machine is to be fed automatically. As the shaft G passes through the front part of the machine and through a corresponding gear in the rear part of course no separate hand wheel G' or worm $b'$ is required for the back half of the machine.

Having thus pointed out the method of reciprocating and rotating the mandrels of my machine I will now describe the tools which each of the mandrels bears. The tap $w$ is firmly set in the end of the mandrel C. On the mandrel C is firmly clamped the collar D, and in front of that is a sleeve E which has a feather on the inside which fits into a key seat. This sleeve E can be freely moved back and forth along the mandrel C but must revolve with it. The sleeve E is connected by the links $f$ to the outwardly curved levers $t$ which are pivoted at $t'$ on the collar D. A ring D' is around the collar D and also includes the outwardly curved levers $t$. Moving this ring D' back and forth operates the levers $t$ which through the links $s$ carry the sleeve E back and forth and locks it in position. On the outside of the ring D' is an annular groove n'. In this groove are pins or slides pivoted to a forked arm n which is attached to the rock shaft F. The rock shaft F is operated by the lever F' on the front side of the machine. When power is applied to the hand lever F' it moves the ring D' back and forth and so carries the collar E forward or back. When no power is applied to the lever F' the rock shaft F will be rocked by the forked arm n which on account of the slides which are in the groove n' accommodate itself to the position of the ring D'. In the sleeve E are placed the milling tools u the ends of which project into the flutes or grooves of the tap w. The tools u are held in position by the screws u' and v.

In using my machine when the radiator loop has been clamped in position the milling tools u with the sleeves E are first moved forward by the levers F' and the bosses milled off even. Bolts a (Fig. 1) project back from the collar E and make it easier to move the ring D' forward. After the milling has been done the milling tools are withdrawn back of the tap w by the same means and the tap is fed forward and cuts the thread in the holes on the radiator loops which are to receive the nipples that assemble the loops into a radiator.

As I have shown my machine it is adapted to cut the threads on one side of the radiator loop right handed and on the opposite side left handed. The threads on both sides can be cut the same by introducing an extra intermediate gear i' as shown in Fig. 4, of course changing the position of the intermediate gear i to accommodate the same, and placing taps of the desired cut in the mandrels C.

Many changes in the details of construction of my machine will readily occur to any skilled mechanic and I do not desire to be confined to the precise method here employed for carrying out my invention.

The main part of my machine can, by placing ordinary lathe chucks on the mandrels, be used to carry a variety of tools and do other work than milling and tapping.

Where there are bosses at only one end of a radiator loop two loops can be operated on at the same time by putting in more of the clamps or vises o, and putting the radiator loops end to end.

What I claim as my invention, and desire to secure by Letters Patent, is—

1. In a machine for milling and tapping radiator loops, reciprocating mandrels in pairs, the axes of each pair being in the same line; in combination with taps on the oppositely facing ends of the mandrels, and sleeves on the mandrels bearing milling tools adapted to be slipped beyond the taps to operate on a radiator loop clamped between them for the purpose specified.

2. In a machine for milling and tapping radiator loops, a mandrel with a screw tap fixed in the end, in combination with a reciprocating collar bearing milling tools adapted to be extended beyond the tap and locked there and withdrawn after use, so that both tools can be used on the same mandrel by merely shifting the sleeve, for the purpose specified.

3. In a machine for milling and tapping radiator loops, the combination of suitable clamps for holding a radiator loop, a pair of oppositely facing reciprocating mandrels bearing screw taps, and sleeves on the mandrels, bearing milling tools adapted to be slipped back of the screw taps by suitable means so that both the screw taps and milling tools can be used, the whole being mounted on a suitable frame, substantially as described.

4. In a machine for milling and tapping radiator loops the combination of a pair of mandrels, whose axes are in the same line, each mandrel bearing a screw tap and milling tools, exactly opposed to those on the other mandrel, a sleeve surrounding each mandrel in which the mandrel only revolves; racks on the sleeves and pinions to operate the racks, the sleeves being reciprocated through suitable bearings, the whole being operated by power suitably applied for the purpose specified.

5. In a machine for milling and tapping radiator-loops the combination of a frame A, with two pairs of mandrels C, sleeves C' having racks C'', pinions g'' engaging said racks, shafts G, in gear with said pinions, and means for operating said shafts, substantially as described.

6. In a machine for milling and tapping radiator loops the combination of a reciprocating mandrel C, the tap w, the fixed collar D, the curved levers t pivoted at t', the links s, the reciprocating sleeve E, having a feather projecting into an elongated key seat on the mandrel C and the milling tools u adapted to be withdrawn back of the tap w, and the ring D', for the purpose specified.

7. In a machine for milling and tapping radiator loops, the combination of parallel pairs of mandrels C; taps w, fixed collars D, curved levers t pivoted at t', the links s, the reciprocating sleeves E which revolve with and reciprocate on the mandrels C, the milling tools u, adapted to be withdrawn back of the taps w, the ends of the tools passing through the grooves in the tap w, the ring D', containing the annular groove n', the rock shaft F, with the forked arms n and the levers F' for the purpose specified.

8. In a machine for milling and tapping radiator loops, the combination of the mandrels C with tools thereon, the sleeves C' with racks C'' reciprocated by the pinions g'' on shaft g geared by intermediate gears to shaft G the mitered gears y and y', the shaft R bearing the worm R', the worm gear x on shaft r, the wheel K with arm K' having pin r'', the weight l, with pin l'', the wheel l' with groove z' and the lever M' operating the belt shifter M, all coacting for the purpose specified.

9. In a machine for milling and tapping radiator loops, the combination of the mandrels C bearing tools, the sleeves C' with racks C'' operated by pinions $g''$ on shafts $g'$ geared by intermediate gears to gear $e$ on shaft G, the worm gear $m$, the shaft $b$, with worm $b''$ geared by gear $d$ to gear $d'$ on mandrel C all coacting for the purpose specified.

10. In a machine for milling and tapping radiator loops, the combination of the mandrels C bearing tools, the sleeves C' with racks C'' operated by pinions $g''$ on shaft $g'$ geared to gear $e$ on shaft G which has hand wheel G', the worm gear $m$ adapted to be clamped to the shaft G by the hand nut $c$; the shaft $b$ with worm $b'$ geared by gear $d$ to gear $d'$ on mandrel C all coacting for the purpose specified.

11. In a machine for milling and tapping radiator loops, the combination of the frame A, the bed H, the shafts P, geared to the oppositely facing mandrels C, the clamps $o$, on platen H', the sleeves C' with rack C'' operated by pinion $g''$ on shaft $g'$ geared by intermediate gears to shaft G, the shaft G operating the similar feed mechanism on the two parallel mandrels C, the shafts F operating by suitable connections sleeves E bearing milling tools on parallel mandrels C substantially as described for the purpose specified.

In witness whereof I have hereunto set my hand and seal in the presence of two witnesses.

JOEL E. BIDWELL. [L. S.]

Witnesses:
E. S. ROOS,
CORA E. WESTBROOK.